United States Patent Office 3,403,058
Patented Sept. 24, 1968

3,403,058
PROCESS FOR PREVENTING BLISTERING OF NICKEL METAL CONTAINING DISPERSED REFRACTORY OXIDE PARTICLES
Warren I. Pollock, Brandywine Hundred, Del., assignor, by mesne assignments, to Fansteel Metallurgical Corporation, a corporation of New York
No Drawing. Filed Dec. 2, 1964, Ser. No. 415,449
5 Claims. (Cl. 148—20.3)

ABSTRACT OF THE DISCLOSURE

Blistering, on high temperature exposure to air, of nickel strengthened with dispersed refractory oxide particles, is prevented by exposing the dispersion-modified nickel at elevated temperature to an atmosphere of humid hydrogen prior to such high temperature exposure to air.

---

Nickel metal, dispersion-strengthened with particulate refractory oxides, can be prepared in a number of ways known to the art. In all cases, however, it is preferable to avoid melting the metal; hence the procedures are those of powder metallurgy. A preferred metal product is known commercially as TD Nickel and contains thoria as the dispersed, particulate refractory oxide. The invention will hereinafter be particularly described with reference to TD Nickel, but it will be understood that the novel processes are more broadly applicable, as set forth in the appended claims.

Briefly, the preparation of TD Nickel comprises reducing an intimate mixture of oxidic compounds of nickel and thoria. Preferably, these oxides are precipitated and co-mingled in aqueous media, filtered, dried and reacted with hydrogen at an elevated temperature. The nickel oxide is reduced to nickel metal particles in which are dispersed very fine, unreduced particles of thorium dioxide. This powdered mixture is then compacted and cold or hot worked in the solid state to yield a fully dense strong product particularly useful because of its high temperature strength.

The high temperature uses for which this product is outstandingly suited often involve exposure to air at temperatures of the order of 2400° F. Unfortunately, however, such exposure to air sometimes results in blistering of the metal, especially when the raw materials used are of only commercial purity. This has a weakening effect, especially when the articles in which the metal is used, e.g., turbine vanes, are fabricated from sheet metal. The blistering is presumably due to gas formation inside the metal, possibly at the grain boundaries.

Now according to the present invention it has been discovered that if a TD Nickel which has the tendency to blister on exposure to air at high temperature is exposed at elevated temperature to an atmosphere of humid hydrogen, the blistering on subsequent high temperature exposure to air does not occur. The metal is preferably treated in thin sections such as sheet or in powder form, and for such materials a treating time of ¼ to 10 hours will usually suffice. Thicker sections require longer times; 1¼" bars have been successfully treated in 18 hours.

The amount of water vapor in the hydrogen may vary considerably. A convenient, well-known method of measuring the amount of water present is by determining the dew point of the gas. This can be established by contacting the hydrogen, prior to use, with liquid water at a prescribed temperature, the degree of contact being sufficient to saturate the hydrogen. Hydrogen having a dew point between 0° F. and 100° F. has been found very satisfactory.

The temperature of treatment may range from 1500° F. to 2400° F. but preferably 1800 to 2100° F. The time will be longer for the lower temperatures and thicker specimens.

It is thought that at least part of the blistering encountered is due to relatively small amounts of carbon present as incidental impurity in the nickel. This amount is usually less than 100 p.p.m. Although this theory is not well proven because the analytical precision at this low carbon level is not sufficient, it is preferred that the volume of humid hydrogen brought into reactive contact with the metal contain at least the quantity of water equivalent to the carbon in the outer $\frac{1}{10}$ inch layer of exposed metal according to the equation $C+H_2O \rightarrow H_2+CO$. Usually a considerable excess is supplied and this may be done either as a static volume of gases in an enclosed treating furnace or by supplying a stream of the gases across the metal.

For example, a 20 lb. compacted-but-porous billet of TD Nickel powder containing 100 p.p.m. of carbon can be enclosed in a metal sheath fitted with inlet and outlet tubes. The sheath is connected to a source of moist hydrogen humidified by bubbling the gas through water at 100° F. Due to the porosity of the billet, all the carbon 0.908 gram, is considered available for reaction. Consequently, about 20 cu. ft. of room temperature hydrogen (an excess) is humidified and passed through the billet at about 1800 to 1900° F. over a period of 5 hours to ensure that the metal after further forging and rolling under non-contaminating conditions will be nonblistering on subsequent exposure to air at 2200° F. for at least one hour.

In another specific instance, a compacted billet of TD Nickel was extruded to sheet bar and rolled to its penultimate gage of 0.125". A portion of this sheet was given a recrystallization heat treatment in vacuum and further rolled to 0.075" gage. This portion on exposure for 1 hour to air at 2200° F. blistered severely. Another portion was treated with an excess of hydrogen, having a 72° F. dew point, at a temperature of 2100° F. for 4 hours. It was then recrystallized and rolled to .075" gage under the same conditions as the first portion. On exposure to air for one hour at 2200° F. this product showed no sign of blistering nor development of internal porosity. On further exposure to air at 2400° F. no visible blistering occurred, and only a trace of internal microporosity was found.

While the invention has been described with particular reference to compositions containing thoria as the dispersed particulate refractory oxide it is also applicable to other compositions in which the refractory oxide is any metal oxide having a free energy of formation, as determined at 1000° C., of more than 90 kilocalories per gram atom of oxygen in the oxide. Oxides having the following formulae fall in this class: $Y_2O_3$, CaO, $La_2O_3$, BeO, $ThO_2$, MgO, $UO_2$, $HfO_2$, $CeO_2$, $Al_2O_3$, $ZrO_2$, BaO, $ZrSiO_4$, and TiO. The size of the dispersed refractory oxide particles will in all cases be below one micron and preferably below 250 millimicrons. The amount of the refractory oxide can be up to 10 volume percent, a maximum of 5% being more preferred.

The advantage of this invention is due primarily to the preservation of strength of TD Nickel when exposed to air at high temperature. Such conditions are found in jet engine parts where high temperature strength is essential. Blistering and development of porosity, even microporosity, degrades the strength properties dangerously.

I claim:
1. In a process for preventing blistering, upon exposure to air at temperatures up to 2200° F., of nickel metal having dispersed therein up to 10% by volume of submicron-sized particles of a refractory metal oxide having a free energy of formation of more than 90 kilocalories per gram atom of oxygen in the oxide, the step comprising exposing said metal at elevated temperature to an atmosphere of humid hydrogen prior to said exposure to air.

2. A process of claim 1 wherein the dispersed, particulate oxide is thoria.

3. A process of claim 1 in which the humid hydrogen has a dew point between 0 and 100° F.

4. A process of claim 1 in which exposure to the humid hydrogen is effected at a temperature in the range from 1500 to 2400° F.

5. A process of claim 1 in which the time of exposure is at least ¼ hour.

References Cited

UNITED STATES PATENTS

| | | | |
|---|---|---|---|
| 2,826,805 | 3/1958 | Probst et al. | 148—126 |
| 3,087,234 | 4/1963 | Alexander et al. | 75—170 |
| 3,172,753 | 3/1965 | Walsh | 75—0.5 |
| 3,268,368 | 8/1966 | Mackiw | 148—126 |

RICHARD O. DEAN, *Primary Examiner.*